Oct. 13, 1959     R. A. ARNOLDI     2,908,136
LOW DRAG FLAMEHOLDER CAPABLE OF FLUTTER DURING OPERATION
Filed Dec. 14, 1956

INVENTOR
ROBERT A. ARNOLDI
BY
ATTORNEY

United States Patent Office 2,908,136
Patented Oct. 13, 1959

2,908,136

LOW DRAG FLAMEHOLDER CAPABLE OF FLUTTER DURING OPERATION

Robert A. Arnoldi, Elmwood, Conn., assignor to United Aircraft Corporation, East Hartford, Conn., a corporation of Delaware Application December 14, 1956, Serial No. 628,427

8 Claims. (Cl. 60—39.72)

This invention relates to combustion chambers and more specifically to flameholder mechanisms for high flow velocities in such combustion chambers.

It is an object of this invention to provide a flameholder mechanism which provides a maximum of turbulence when in operation and a minimum of drag when not in operation.

It is a further object of this invention to provide a flameholder mechanism of the type described without resorting to the heavy structures attendant with use of, for example, retractible flameholders.

It is a still further object of this invention to utilize streamlined flameholder elements which normally present a minimum of drag but present considerable turbulence in the gas flow when permitted to flutter.

Another object of this invention is to provide a means for holding the streamlined flameholder elements against fluttering when not in use with further means being provided to synchronize this operation with operation of a variable area exhaust nozzle.

These and other objects of this invention will become readily apparent from the following detailed description of the drawing in which.

Figure 1:
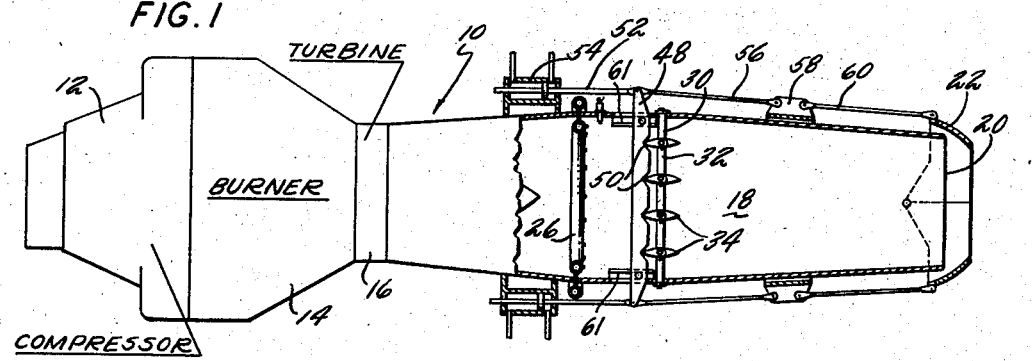
Fig. 1 is a schematic illustration of a turbojet power plant with some of the parts in partial cross-section to better illustrate the invention.

Referring to Fig. 1, a turbojet power plant is generally indicated at 10 as having a compressor 12, a burner 14, a turbine section 16, an afterburner section 18, and an exhaust nozzle 20 which may have its area varied by a plurality of clamshell-type lids 22. The fuel distributing member 26 is provided to inject additional fuel into the power plant at a point downstream of the burner 14 and turbine 16 to provide afterburning in the power plant and additional thrust.

A flameholder mechanism 30 is provided in the afterburner section 18 and comprises a supporting bar 32 which carries a plurality of airfoil-shaped members 34 which span the afterburner duct and extend transversely of the axis of flow through the afterburner. Each of the streamlined members 34 is mounted on a shaft 40 (Fig. 3) which is pivotally mounted in a slot 42 in the member 30. The shaft 40 is fixed to one end of a coil spring 44 which has its other end fixedly mounted at 46 to the transverse member 30. With this type of mounting the airfoil member 34 is free for limited pivotal movement about the shaft 40, thus providing airfoils which can simultaneously oscillate about a span-wise axis, and execute lateral oscillations transversely of the axis of flow through the afterburner. An alternate configuration may be had by replacing the slot 42 by a simple pivot as shown in Figs. 1 and 2, so that only pivotal oscillations are permitted.

As seen in Fig. 1, a locking member 48 is provided with a plurality of notches or detents 50 (Fig. 3) which are intended to engage the leading edge of each of the streamlined members 34. The locking member 48 is connected by a linkage 52 to a servo cylinder piston combination 54 which can be moved fore and aft by fluid under pressure with any suitable well-known control. The link 52 is also connected to a link 56, carriage 58 and linkage 60 which connects to the eyelids 22 on the exhaust nozzle. Thus, rearward movement of the cylinder piston combination 54 will engage the member 48 and the detents 50 with the leading edge of the streamlined members 34 and simultaneously decrease the area of the nozzle 20 by moving the eyelids 22 to the position shown in Fig. 1. Slotted guides 61 suitably engage the supporting bar 32 adjacent its extremities.

Figure 2:
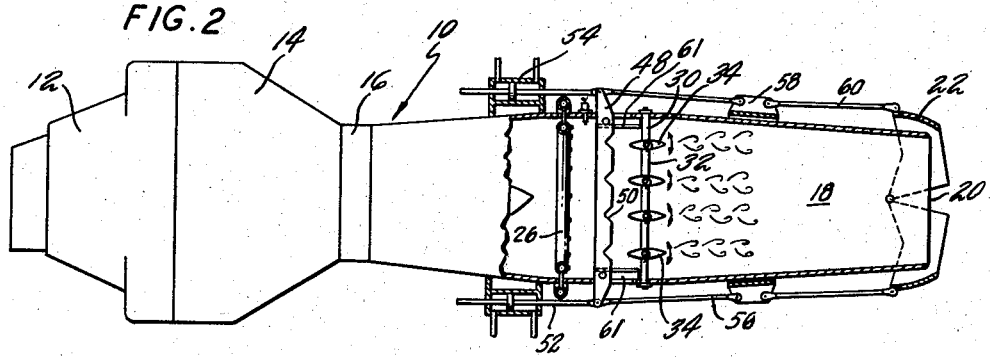
Fig. 2 is similar to Fig. 1 with the flameholder parts in the operative position.
Figure 3:
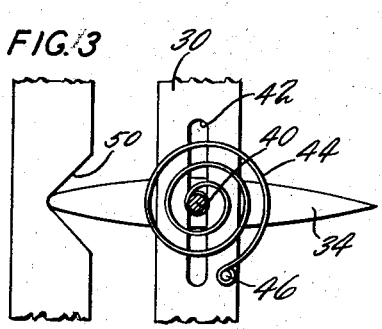
Fig. 3 is an enlarged detailed cross-section illustrating the mounting for the flameholder elements.

As seen in Fig. 2, the cylinder piston combination has been actuated toward the left, thereby moving the transverse locking member 48 out of engagement with the streamlined members 34, so that they will be free to oscillate about their pivot shaft 40 (see Fig. 3 also). In this position the airfoil members 34 will oscillate in the manner shown, thereby creating a turbulence downstream thereof to provide adequate flameholding operation.

When the detent 48 is engaged, some motion of the airfoils about the points of engagement with the detent is possible where both a pivot 40 and slot 42 are provided. However, flutter about these points is highly improbable.

At the same time that the locking member 48 has been moved to the left out of engagement with the streamlined members 34, the eyelids 22 are opened to provide an increased exhaust nozzle area to accommodate the additional mass flow during the afterburning operation. It is thus apparent, with the position of the flameholder elements 34 as shown in Fig. 1, a very minimum of drag is present during the non-afterburning operation, thus maximum power plant efficiency is obtained. On the other hand, in the position shown in Fig. 2 adequate turbulence is provided to obtain the necessary flameholding for the afterburner operation.

Figure 4:
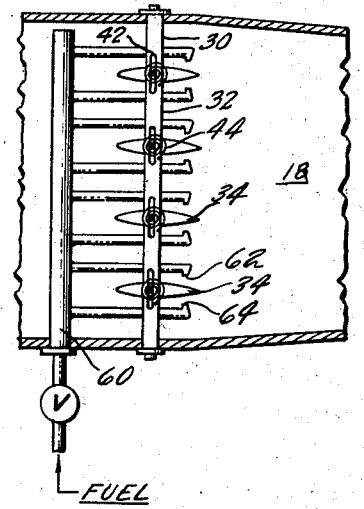
Fig. 4 is a partial cross-section illustrating a means for exciting oscillation of the flameholder elements.

As seen in Fig. 4, a secondary fuel distributor line 60 may be provided with a plurality of nozzles 62 and 64 which cause fuel to impinge on the upper and lower trailing edge surfaces of the streamlined members 34. This presents a well-known unstable configuration and will cause the airfoil to oscillate at a desirable frequency. This configuration is intended to apply when the nature of the particular afterburner design does not permit self-excited aerodynamic flutter but requires an additional mechanism to cause vibration. It should be pointed out that the springs 44 shown in both Figs. 3 and 4 are intended to regulate or predetermine the natural frequency of the torsional vibration of the streamlined elements 34. It is apparent that as a result of this invention a simple yet highly efficient flameholder mechanism has been provided which will cause a minimum drag when not operating and will hence have the least possible adverse effect on normal engine operation. At the same time when it is desirable to provide flameholding, efficient flameholding action is provided. Furthermore, the mechanism for operating or disabling the flameholder mechanism is connected to operate simultaneously with the elements which vary the area of the exhaust nozzle.

Although only one embodiment of this invention has been illustrated and described herein, it will be apparent that various changes and modifications may be made in the construction and arrangement of the various parts without departing from the scope of this novel concept.

What it is desired by Letters Patent is:

1. In a combustion chamber having high velocity gases flowing therethrough, means for introducing fuel into said combustion chamber, flameholder means for stabilizing the flame in said combustion chamber including a plurality of streamlined members extending transversely of the axis of flow through the combustion chamber, each of said members having a spanwise axis, and means for mounting said members for relatively free but limited pivotal movement about said spanwise axis and limited movement transversely of said axis.

2. In a combustion chamber having high velocity gases flowing therethrough, means for introducing fuel into said combustion chamber, flameholder means for stabilizing the flame in said combustion chamber including a plurality of streamlined members extending transversely of the axis of flow through the combustion chamber, each of said members having a spanwise axis, and means for mounting said members for relatively free but limited pivotal movement about said spanwise axis and limited movement transversely of said axis, and means for restraining said members against movement.

3. In a combustion chamber having high velocity gases flowing therethrough, means for introducing fuel into said combustion chamber, flameholder means for stabilizing the flame in said combustion chamber including a plurality of streamlined members extending transversely of the axis of flow through the combustion chamber, means for mounting each of said streamlined members on a spanwise axis whereby said members may flutter about said axis, and detent means for engaging each of said members to prevent flutter and maintain them in streamlined alignment with the stream.

4. In a combustion chamber having high velocity gases flowing therethrough, an exhaust nozzle receiving fluid from said combustion chamber, means for introducing fuel into said combustion chamber, flameholder means for stabilizing the flame in said combustion chamber including a plurality of streamlined members extending transversely of the axis of flow through the combustion chamber, each of said members having a spanwise axis, means for mounting said members for pivotal movement about said axis including a spring, means engageable with said members for restraining said members against movement about said axis, and means for engaging said restraining means.

5. In a combustion chamber having high velocity gases flowing therethrough, an exhaust nozzle receiving fluid from said combustion chamber, means for varying the area of said nozzle, means for introducing fuel into said combustion chamber, flameholder means for stabilizing the flame in said combustion chamber including a plurality of streamlined members extending transversely of the axis of flow through the combustion chamber, each of said members having a spanwise axis, means for mounting said members for pivotal movement about said axis including a spring bias, means engageable with said members for restraining said members against movement about said axis, and means for simultaneously reducing the area of said nozzle and engaging said restraining means.

6. In a combustion chamber having high velocity gases flowing therethrough, an exhaust nozzle receiving fluid from said combustion chamber, means for varying the area of said nozzle, means for introducing fuel into said combustion chamber, flameholder means for stabilizing the flame in said combustion chamber including a plurality of streamlined members of airfoil shape extending transversely of the axis of flow through the combustion chamber in substantial alignment with the fluid stream, means for mounting said members for pivotal movement about a spanwise axis including a spring for biasing movement of said members about said axis, detent means engageable with said members for restraining said members against movement about said axis, and means for simultaneously reducing the area of said nozzle and engaging said restraining means.

7. In a combustion chamber having high velocity gases flowing therethrough, means for introducing fuel into said combustion chamber, flameholder means for stabilizing the flame in said combustion chamber including a plurality of streamlined members extending transversely of the axis of flow through the combustion chamber, each of said members having a spanwise axis, and means for mounting said members for limited and substantially unrestrained oscillatory pivotal movement about said spanwise axis as a result of the gas stream flowing thereover, and means for restraining said members against movement about said axis in a streamlined position relative to the gases flowing by said members.

8. In a combustion chamber having high velocity gases flowing therethrough, means for introducing fuel into said combustion chamber, flameholder means for stabilizing the flame in said combustion chamber including a plurality of streamlined members extending transversely of the axis of flow through the combustion chamber, each of said members having a spanwise axis, and means for mounting said members for limited and substantially unrestrained oscillatory pivotal movement about said spanwise axis, means separate from the gas stream flowing through the combustion chamber for exciting said oscillatory movement, and means for restraining said members against movement about said axis in a streamlined position relative to the gases flowing by said members.

References Cited in the file of this patent

UNITED STATES PATENTS

| 1,237,779 | Hedrick | Aug. 21, 1917 |
| 2,696,709 | Oulianoff | Dec. 14, 1954 |
| 2,835,108 | Karen | May 20, 1958 |

FOREIGN PATENTS

| 510,584 | Canada | Mar. 1, 1955 |